US012518213B2

United States Patent
Das et al.

(10) Patent No.: US 12,518,213 B2
(45) Date of Patent: Jan. 6, 2026

(54) SUSTAINABLE RETRAINING FOR PRODUCTION MACHINE LEARNING

(71) Applicant: ACCENTURE GLOBAL SOLUTIONS LIMITED, Dublin (IE)

(72) Inventors: Sankar Narayan Das, Barrackpore (IN); Kuntal Dey, Birbhum (IN); Kapil Singi, Bangalore (IN); Vikrant Kaulgud, Pune (IN); Sanjay Podder, Thane (IN); Andrew Francis Hickl, Sammamish, WA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 578 days.

(21) Appl. No.: 18/095,632

(22) Filed: Jan. 11, 2023

(65) Prior Publication Data

US 2024/0232698 A1   Jul. 11, 2024

(51) Int. Cl.
  *G06N 20/00*   (2019.01)
(52) U.S. Cl.
  CPC .................................... *G06N 20/00* (2019.01)
(58) Field of Classification Search
  None
  See application file for complete search history.

(56) References Cited

U.S. PATENT DOCUMENTS

| | | | | |
|---|---|---|---|---|
| 10,565,475 | B2* | 2/2020 | Lecue | G06N 3/045 |
| 10,929,268 | B2* | 2/2021 | Bhat | G06N 20/00 |
| 11,822,913 | B2* | 11/2023 | Oros | G06N 20/00 |
| 2018/0089591 | A1* | 3/2018 | Zeiler | G06N 3/045 |
| 2019/0318198 | A1* | 10/2019 | Griffin | G10L 15/063 |
| 2019/0325265 | A1* | 10/2019 | Lecue | G06N 7/01 |
| 2019/0332508 | A1* | 10/2019 | Goyal | G06F 11/3414 |
| 2020/0097388 | A1* | 3/2020 | Bhat | G06F 11/3608 |
| 2020/0134374 | A1* | 4/2020 | Oros | G06N 3/09 |

OTHER PUBLICATIONS

Dalia Sobhy, et al. "Continuous and Proactive Software Architecture Evaluation: An IoT Case" ACM Transactions on Software Engineering and Methodology (TOSEM) 31, No. 3 (2022): 1-54.

(Continued)

*Primary Examiner* — Maikhanh Nguyen
(74) *Attorney, Agent, or Firm* — Mannava & Kang, P.C.

(57) ABSTRACT

A retraining monitoring system maintains the sustainability of a production machine learning (ML) model system that includes a production ML model retraining platform. The retraining monitoring system collects contextual data from the production ML model system and determines if one or more of a currently-selected architectural options has to be changed for sustainability. An architectural option of the production ML model retraining platform, such as, a processing location is selected from a cloud retraining platform or an on-premises retraining platform by a selection process based on a multi-armed bandit problem. An evaluation of the retraining architecture is dealt with as a reinforcement learning problem to implement one of a periodic retraining architecture or a reactive retraining architecture.

17 Claims, 8 Drawing Sheets

(56) References Cited

OTHER PUBLICATIONS

Doris Xin, et al. "Production Machine Learning Pipelines: Empirical Analysis and Optimization Opportunities" In Proceedings of the 2021 International Conference on Management of Data, pp. 2639-2652. 2021.
Roy Schwartz, et al."Green al." Communications of the ACM 63, No. 12 (2020): 54-63.
Julien Siebert, et al. "Construction of a quality model for machine learning systems." Software Quality Journal 30, No. 2 (2022): 307-335.

* cited by examiner

SUSTAINABLE RETRAINING FOR PRODUCTION MACHINE LEARNING

BACKGROUND

A production machine learning (ML) system continuously operates in production to achieve certain goals. Particularly, ML is used to train models to make predictions that are used in the production ML system. While the core functionality of some production ML systems is based on such predictions, in other production systems predictions from ML models may only perform peripheral functions. In these various systems, the primary focus of ML has been to develop accurate models. However, the performance of production ML systems usually degrades over time due to data drift. Data drift signifies the differences between the training data and production data which causes degradation of quality in the ML model outputs such as inferences and recommendations.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
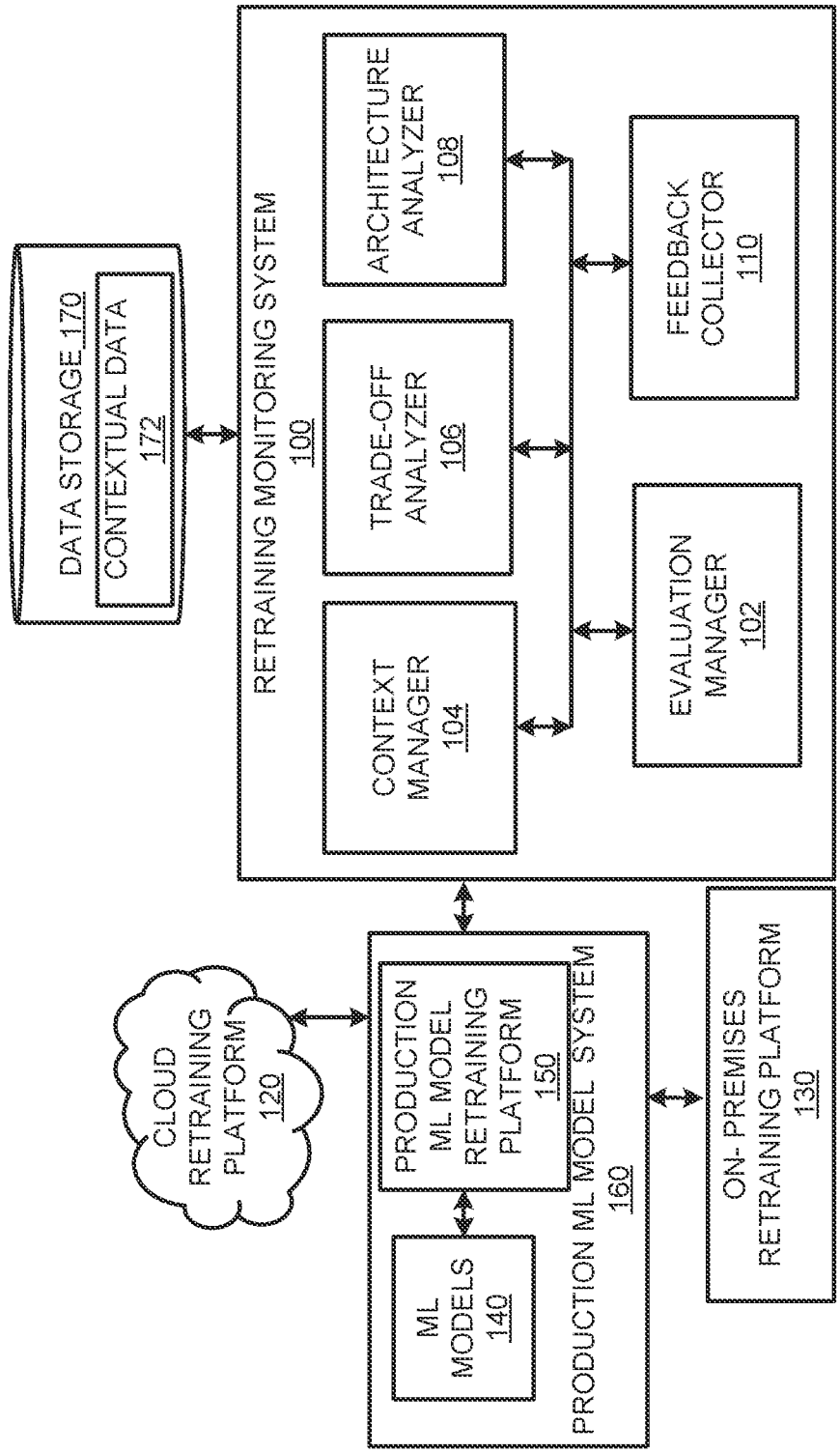
FIG. 1 shows a block diagram of a retraining monitoring system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A retraining monitoring system enables the implementation of a sustainable ML model retraining platform in production systems. The retraining monitoring system collects contextual data regarding a production ML model platform and the ML models that are maintained by the production model retraining platform. The retraining platform is configured to retrain ML models that are used in production so that the results or output of the ML models are employed as part of the functionality executed by the computing systems used in production. In an example, the retraining platform may be part of the production system. In an example, the retraining platform may be disparate from the production system but is communicatively coupled to the production ML models for training/retraining purposes. The production ML platform can implement one of a plurality of retraining platforms which can include a cloud retraining platform and an on-premises retraining platform. Furthermore, the retraining platform can also implement one of a plurality of retraining architectures. In an example, the plurality of retraining architectures may include a periodic retraining architecture and a reactive retraining architecture. Whenever the production ML models are to be retrained, the retraining monitoring system determines if the current training platform or the current retraining architecture is to be changed, and if so, executes a selection process to select one of the plurality of retraining platforms and one of the plurality of retraining architectures based on sustainability criteria. Depending on the selections made, the retraining monitoring system may change one or more of the current training platform and the current retraining architecture. Sustainability criteria can include certain standards or predetermined values set for some of the context variables or parameters of the retraining platform. Sustainability refers to the ability to maintain or support a process continuously over time with minimal use or depletion of natural or physical resources, so that they will remain available for the long term.

In an example, the contextual data collected from the components of the production ML model system may include, for each component, the inputs, outputs, the location of processing, details regarding the processing, and computation/storage infrastructure information. To collect the contextual data, the monitoring system may monitor the various components of the production ML model platform using different metrics such as but not limited to, the number of active components, total processor time, frequency of activation, etc. The contextual data along with the parameters associated with the components such as but not limited to, energy demand, energy efficiency, carbon emission, overall infrastructure demand, and overall infrastructure efficiency may provide information regarding the components from a sustainability perspective.

In an example, the retraining monitoring system may be considered as a component of the whole evaluation framework. The retraining monitoring system models the trade-off between the plurality of retraining platforms as a multiarmed bandit problem in which Thompson sampling is applied to analyze the various trade-offs at run time. A determination regarding changing a current retraining platform to another model retraining platform is thus enabled during the runtime of the production system. In accordance with the multiarmed bandit problem, each of the plurality of retraining platforms is modeled as an arm of a multiarmed bandit wherein each of the arms provides a corresponding reward. In an example, the reward of an arm corresponding to a particular training platform is estimated from the sustainability context information as the reward is a measure of the sustainability of that arm. In an example, two contextual variable values, delay of communication and energy consumption of processing may be used in the reward calculation. Energy consumption of processing can be based on two factors, including the duration of the processing and the energy source of the data center. Initially, random choices may be made from the different arms and their rewards calculated. The reward distribution associated with each of the different arms is thus updated.

The architectural evaluation problem is processed by the retraining monitoring system as a policy evaluation problem of reinforcement learning. The concepts of policy evaluation and value function approximation of reinforcement learning, are applied to evaluate different retraining architectures which may include periodic retraining architecture and reactive retraining architecture. At any instant in time, the state of a retraining architecture can be represented by values of selected parameters. The selected parameters enable estimating the sustainability of a particular architecture. A plurality of production retraining architectures with actions executable on the production ML model retraining platform in different states and times are modeled as multiple policies. Particularly, the architecture decisions in any state can be represented as an action taken in that state. The reward value is estimated from contextual information. The reward signifies the sustainability of the architecture. The reinforcement learning problem is represented as a tuple of a set of states of architecture, a set of available actions executable on the production ML model retraining platform, and the reward function that represents the reward received after executing an action 'a' in the state 's'. The concept of the Gradient Monte Carlo algorithm is used to estimate the value of a policy. The weight for the policy is updated on applying the policy and obtaining the reward. The updated weight may be used in the next iteration to determine if the particular retraining architecture is sustainable. Each state is parameterized by two parameters that include the number of new data samples and the number of new and drifted data samples. Based on comparisons of the parameter values with the predetermined threshold values, different actions can be executed such as waiting for the next batch of data, testing for data shift of the current batch of data, and retraining the ML models. The reward functions are updated based on the successful retraining of the ML model.

The quality of outputs from production ML models may degrade over time due to data drift. As a result, production ML models may need to be retrained as low-quality outputs hamper the trustworthiness of the production ML models. The production data differs from the training data due to data drift as the training data is data used during the pre-production training of the ML models while production data is data processed and inferred by the production ML systems. The parameters of data shift are not known a priori. Retraining the ML models based on the production data is the most common strategy to mitigate the effect of data shift. Such retraining may be performed several times during the lifetime of an ML model. Sustainability or energy conservation is one of the attributes of a successful retraining framework of a production ML model. The sustainable retraining framework needs to be self-adaptive to variations that may occur in the data and within the production and retraining systems.

The retraining monitoring system as described herein enables the implementation of a data-driven, contextual framework that evaluates the sustainability of a retraining platform and architecture for production ML models at runtime. The retraining monitoring system thus continuously monitors the production ML model system to collect contextual data that enables estimating the sustainability of different architectural implementations. The retraining monitoring system improves the sustainability of production ML model systems by classifying the relevant attributes which measure the sustainability of different architectural components of the retraining framework. The retraining monitoring system converts an architectural trade-off analysis into a reward optimization process and carries out continuous analysis of the sustainability of the retraining platforms and architectures. Different retraining platforms and architectures are compared and evaluated at runtime by using the concept of reinforcement learning to optimize sustainability while maintaining the output quality of the production ML models.

FIG. 1 shows a block diagram of a retraining monitoring system 100 in accordance with the examples disclosed herein. The retraining monitoring system 100 is communicatively coupled to a production ML model system 160 that includes a production ML model retraining platform 150 which retrains one or more production ML models 140 to evaluate the sustainability of the retraining system 150 continuously and to reset the production ML model retraining platform 150 to implement a retraining framework architecture that achieves optimal sustainability. In production, the ML models 140 may lose accuracy due to data shift thereby necessitating training the ML models 140 on fresh training data. In an example, the production ML model retraining platform 150 can be connected to one or more of a cloud retraining platform 120 and an on-premises retraining platform 130. Based on the contextual data 172, the retraining monitoring system 100 may change one or more of a current retraining platform or current retraining architecture to fulfill the sustainability criteria without compromising the accuracy of the ML models 140.

The retraining monitoring system 100 includes an evaluation manager 102, a context manager 104, a trade-off analyzer 106, an architecture analyzer 108, and a feedback collector 110. The context manager 104 monitors the production ML model system 160 and collects contextual information associated therewith to be stored as contextual data 172. The trade-off analyzer 106 and the architecture analyzer 108 employ the contextual data 172 to select sustainable options from the multiple options available for implementation on the production ML model retraining platform 150. The trade-off analyzer 106 can employ the contextual data 172 to select a sustainable architectural option such as, the cloud retraining platform 120 or the on-premises retraining platform 130 for re-training the ML models 140 to improve accuracy. Similarly, the architecture analyzer 108 also can employ the contextual data 172 to implement a periodical or a reactive framework, whichever improves sustainability, for implementation by the production ML model retraining platform 150 during the retraining of the ML models 140. It may be appreciated that upon implementing one of the multiple options, the retraining monitoring system 100 can continue to monitor the production ML model retraining platform 150 during runtime by repeating the steps of collecting and analyzing the contextual data 172 to determine the sustainability of the implemented options. When the accuracy of one or more of the ML models 140 is determined to have degraded, the retraining monitoring system 100 may repeat the steps of selecting one of the multiple options that maximizes the sustainability, implementing the selected model retraining platform, and the selected policy associated with the selected option on the retraining platform 150.

The contextual data 172 can include data associated with the various modules of the production ML model system 160. In an example, the production ML model system 160 can include modules for data processing, data shift checking, new training data generation, retraining, model evaluation, deployment, and feedback loops. Each module can be further partitioned into components. The sustainability of each of the components can be characterized by certain contexts, which may include but are not limited to, inputs, outputs, locations of processing, the processes executed, computation and storage infrastructure. In an example, the input data collected for a component can include but is not limited to, the volume of incoming data, communication costs, and upstream data sources. The output data collected from the components may include but is not limited to, the volume of outgoing data, communication costs, downstream data consumers, and accountability. The contextual data 172 collected for a component can include but is not limited to, the contents of infrastructure (modeled as Type of infrastructure:<on premises, cloud, hybrid>), the energy sources used (modeled as e.g., Carbon emission:<green, carbon, hybrid>), the demand for the source (modeled as Demand of the source:<high, low>), data center Power Usage Effectiveness (PUE), etc. The contextual data 172 collected for the processing aspects of the components may include but is not limited to, duration of the processing, maximum computational load, maximum memory load, total data stored, data overhead, computation overhead, etc. The computation and storage infrastructure based contextual data can include but is not limited to, the type of processors (e.g., modeled as Processor type:<CPU, GPU, TPU>), wherein the processor type is a context variable which can take one of the central processing unit (CPU), graphical processing unit (GPU), and Tensor Processing Units (TPU). Other contextual data can include the number of processors, and the processor specifications, such as speed, energy efficiency, processor idle time, average processor time, storage type, storage location, etc. Each of the components can be monitored using different metrics. The metrics used can include the number of active sub-components, frequency of activation of the component, total processor time used by the component, total storage used for the data of the component, success rate of the component, throughput, and time sensitivity of the component. The contextual data 172 along with the parameters associated with a component can provide certain information from the sustainability perspective. These can include, energy demand, energy efficiency, carbon emission, overall infrastructure demand, overall infrastructure efficiency, etc. The data-driven sustainability analysis by the retraining monitoring system 100 can provide a sustainability map of the production ML model system 160 at any given time instance. The data-driven sustainability analysis can provide a risk analysis of the production ML model system 160 which may be at risk of under-utilized infrastructure, over-loaded components, and inefficient location management. Under-utilized infrastructure consumes energy without output and hence is energy inefficient. Overloaded components may incorporate delay leading to excess energy consumption. Inefficient location management may lead to unnecessary carbon emissions.

In an example, the trade-off analyzer 106 can be configured to formulate the trade-off analysis as a multi-armed bandit problem. Thompson sampling is applied to analyze the various trade-offs at run time without hampering the efficiency of the production ML model system 160. The architecture analyzer 108 may represent a specific architecture as a deterministic policy. The states of the architecture can be estimated from the parameter values. A reward that is indicative of sustainability for a given architecture can be estimated from the contextual data 172. The evaluation manager 102 may receive the outputs of the trade-off analyzer 106 and the architecture analyzer 108 to determine the retraining platform to be selected and/or the retraining architectural policy to be implemented to maintain the sustainability of the production ML model system 160 while maintaining the accuracy of the ML models 140.

The success of retraining the ML models 140 is determined by the feedback collector 110. In an example, the feedback collector 110 may collect data regarding the accuracy of the ML models 140 from the production ML model system 160. If retraining of the ML models 140 is successful i.e., if the accuracy of the retrained models is higher than the accuracy of the prior models, then the values of the reward along with the selected option including the current model retraining platform and/or the action executed thereon can be labeled and stored accordingly for further training by the feedback collector 110.

Figure 2:
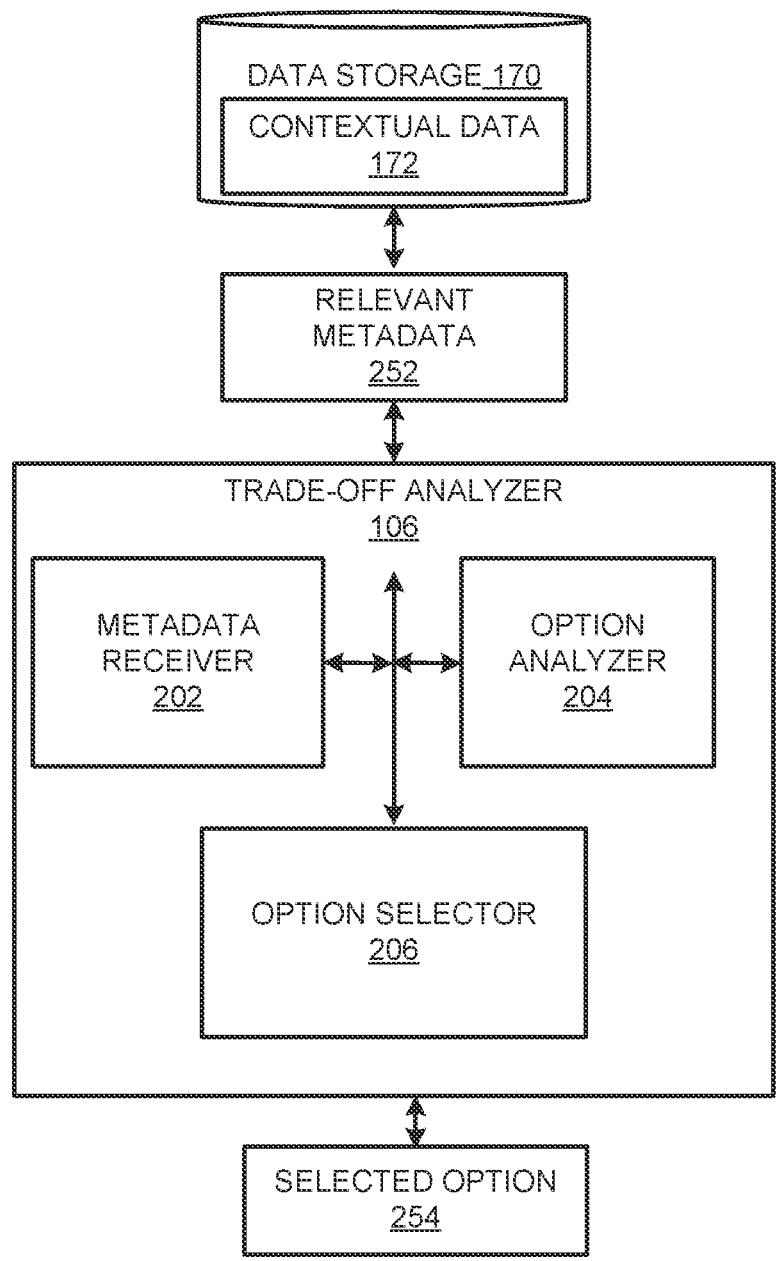
FIG. 2 shows a block diagram of a trade-off analyzer in accordance with the examples disclosed herein.

FIG. 2 shows a block diagram of the trade-off analyzer 106 in accordance with the examples disclosed herein. The trade-off analyzer 106 includes a metadata receiver 202, an option analyzer 204, and an option selector 206. The metadata receiver 202 accesses the relevant metadata 252 from the contextual data 172 collected from the production ML model system 160. In an example, the relevant metadata 252 can include sustainability information related to the cloud retraining platform 120 and the on-premises retraining platform 130. The trade-off analyzer 106 implements a data-driven analysis for identifying from multiple options, an option that maximizes a specific objective. The option analyzer 204 considers each option in the architectural trade-off analysis as an arm of a multi-armed bandit problem wherein each option (or arm) provides some reward. The reward (in this case the platform sustainability) may be initially unknown due to the uncertainty associated with the ML models 140 in production. The option analyzer 204 can estimate the sustainability of the retraining platforms from the relevant metadata 252 which can include without limitation, the processing duration, and energy source of the data center. The reward is based on the delay of communication and energy consumption of processing. In an example, the reward distribution may be represented by a Gaussian distribution, and the option selector 206 can select an option 254 which can maximize sustainability while improving the accuracy of the ML models 140 from the multiple options based on the concept of Thompson sampling. In an example, the selected option can include the cloud retraining platform 120 or the on-premises retraining platform 130. In an example, the data for retraining the ML models 140 can be stored in databases on the cloud retraining platform 120 or the on-premises retraining platform 130 to enable the selection at run time. The evaluation manager 102 can receive the selected option 254 and cause the production ML model retraining platform 150 to begin retraining the ML models 140 from the platform in the selected option 254.

Figure 3:
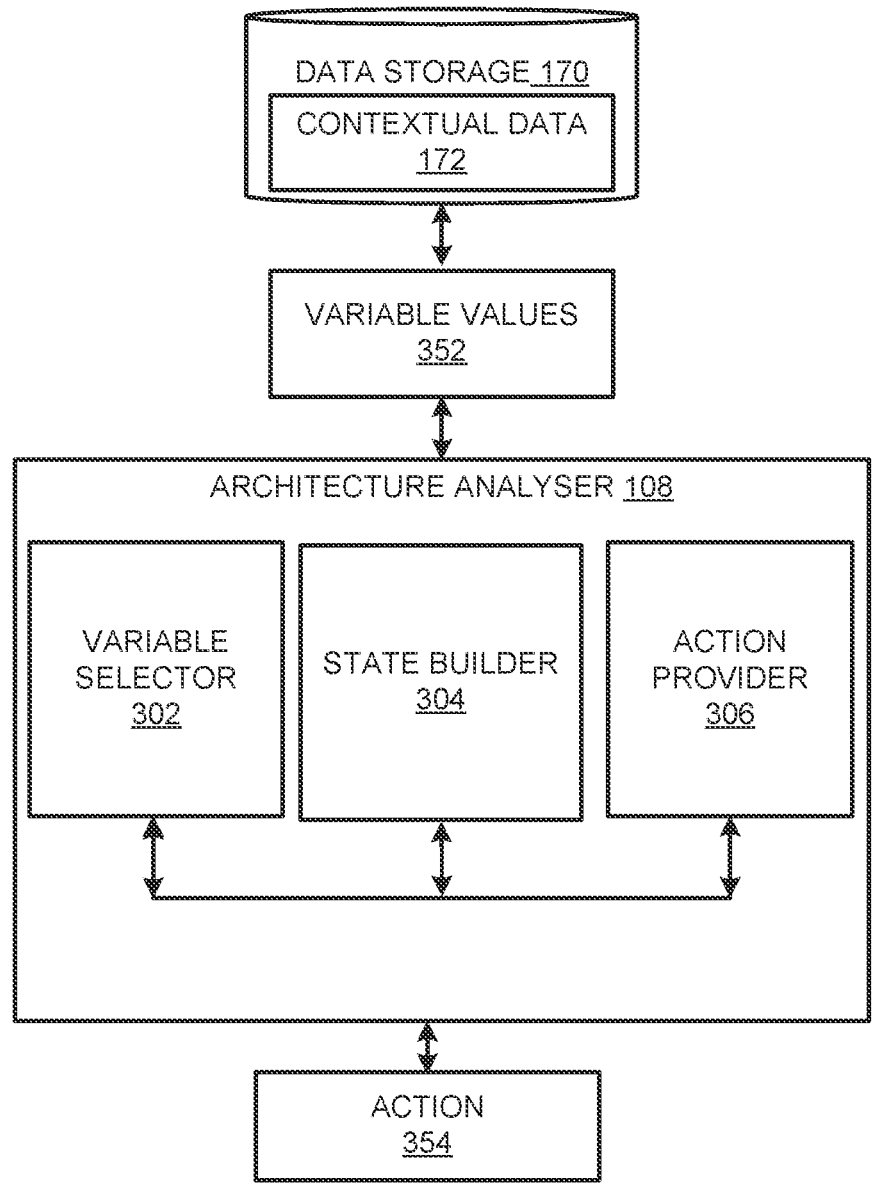
FIG. 3 shows a block diagram of an architecture analyzer in accordance with the examples disclosed herein.

FIG. 3 shows a block diagram of the architecture analyzer 108 in accordance with the examples disclosed herein. The architecture analyzer 108 applies the concept of reinforcement learning for evaluating different retraining architectures to be applied for retraining the ML models 140. In an example, the architecture analyzer 108 can implement a policy-based algorithm that estimates the optimal policy. The policy can be parameterized directly using learnable weights so that the learning problem is rendered into an explicit optimization problem. A specific retraining architecture can be represented by a deterministic policy. To compare two retraining architectures, two policies are conjugated which represent the retraining architectures as a stochastic policy. At any state 'S', any available action 'a' is selected with a probability of p>0. Assuming that an action 'a' is taken in the state 'S' of an architecture A1, and an action 'b' is taken in the same state 'S' with another architecture A2, the conjugated stochastic policy can be determined as $p_1+p_2$ wherein $p_1$ and $p_2$ are the respective probabilities with which the actions a and b are taken.

A reinforcement learning problem can be represented by a tuple <S, A, R>, where S is the set of states of the architecture, A is the set of available actions, and R is the reward function which represents the reward received after taking an action 'a' in the state 's'. The concept of the linear value function approximation method is used to evaluate a policy or the retraining architecture represented by the policy. The concept of the Gradient Monte Carlo algorithm can be applied to estimate the architecture. In an example, two retraining architectures, i.e., periodic retraining architecture and a reactive retraining architecture may be the different target architectures (policies) that are evaluated. In the periodic retraining architecture, the ML models 140 are retrained periodically whereas in the reactive retraining architecture the ML models 140 are retrained whenever new data samples are collected. The periodicity may be defined in the retraining monitoring system 100 either temporally or in terms of the number of data points collected. The state of a specific retraining architecture may be updated from the contextual data 172 using the update function shown below:

$$w \leftarrow w + \alpha[R + \gamma v'(S', w - v'(S, w)]\nabla v'(S, w) \quad \text{Eq. (1)}$$

The concepts of polynomials are used to construct the features to represent each state. Assuming that each state is represented by p parameters, and the parameter values are represented by x1, x2, x3, ..., xp, wherein xi>=0 for all i, the feature set X(s) can be represented as:

$$X(s) = \{(xCi * xCj) \quad \text{Eq. (2)}$$

for all $$(1 >= i >= p)$$

and $$(1 >= j >= p)$$

and $$(i \neq j)$$

and $$C \in \{0, 1\}\}$$

Wherein the value of the state is given as:

$$V(s) = w * X(s)^T \quad \text{Eq. (3)}$$

The retraining monitoring system 100 monitors an existing architecture implemented by the production ML model retraining platform 150. The collected data is called history. The collected data is partitioned into multiple episodes. Each episode is populated by a sequence of states, actions, and rewards, <S1, A1, R1; S2, A2, R2, ..., St, At, Rt>. The end of an episode can be determined by architectural considerations. Deployment of a new model may be considered as an end of an episode in one example. In one example, the retraining of a model with newly sampled data may be considered an end of an episode.

A retraining architecture at any given time can be represented by the architecture analyzer 108 as a set of parameters that enable determining the sustainability of that retraining architecture. The architectural decision in any state relates to the action taken during that particular architecture. The reward value which is obtained from the contextual data 172 signifies the sustainability of the retraining architecture. Accordingly, the architecture analyzer 108 includes a variable selector 302, a state builder 304, and an action provider 306. The variable selector 302 selects variable values 352 from the contextual data 172. The context manager 104 constantly monitors the production ML model system 160 to collect the contextual data 172 which can be used in architecture analysis.

In an example, the variable selector 302 may also generate necessary variable or parameter values from the contextual data 172 using mathematical operations such as averaging, counting, etc. An example of variable values obtained via mathematical operations may include values of the parameters that characterize the states, viz., $d_n$—the number of new data samples and $d_d$—the number of new and drifted data samples. In the periodic retraining architecture, the ML models 140 are retrained whenever $T_{new}$ new data samples are collected. Determining the appropriate value of $T_{new}$ beforehand can be challenging due to data drift. Further, the value of $T_{new}$ may change over time due to the data drift. For reactive retraining architecture, the newly collected data samples are tested for data drift. If data drift is detected and $T_{drift}$ new and drifted data samples are collected, then one or more of the ML models 140 are retrained. Retraining improves the quality of the ML models 140 over time.

The state builder 304 generates a set of states to represent a retraining architecture. Each state S can be parameterized by the number of new data samples $d_n$ and the number of new and drifted data samples da. A state can be represented by the state builder 304 as a feature set $\{1, d_n, d_d, d_n*d_d\}$. The action provider 306 applies certain criteria e.g., predefined threshold values to the feature set to select and provide an action 354 to be implemented on the selected option 254 from an action set which can include a set of actions that can be implemented on the cloud retraining platform 120 or the on-premises retraining platform 130. Various actions that are implemented can include retraining the ML models 140 on newly collected data, testing for data shift/data drift within the current training data, waiting for the next batch of data, etc. Within the possible actions that can be implemented, an action that maximizes the reward function may be identified as the action 354 to be implemented by the action provider 306. The success of retraining can be estimated from the contextual data 172 collected by monitoring the production ML model system 160 after retraining the ML models 140. Retraining is successful if the retrained model provides better accuracy than the previous model. In an example, the rewards may be set to train the architecture analyzer 108 for successful/unsuccessful retraining as:

$$R = 10/(\text{energy\_source}) \text{ if retaining is successful-} \quad \text{Eq. (4)}$$

$$R = 10*(\text{energy\_source}) \text{ if retaining is unsuccessful,} \quad \text{Eq. (5)}$$

$$R \text{ may be set to zero for other actions for simplicity.} \quad \text{Eq. (6)}$$

The energy source may be set to 2 if it only uses carbon-based fuels.

Figure 4:
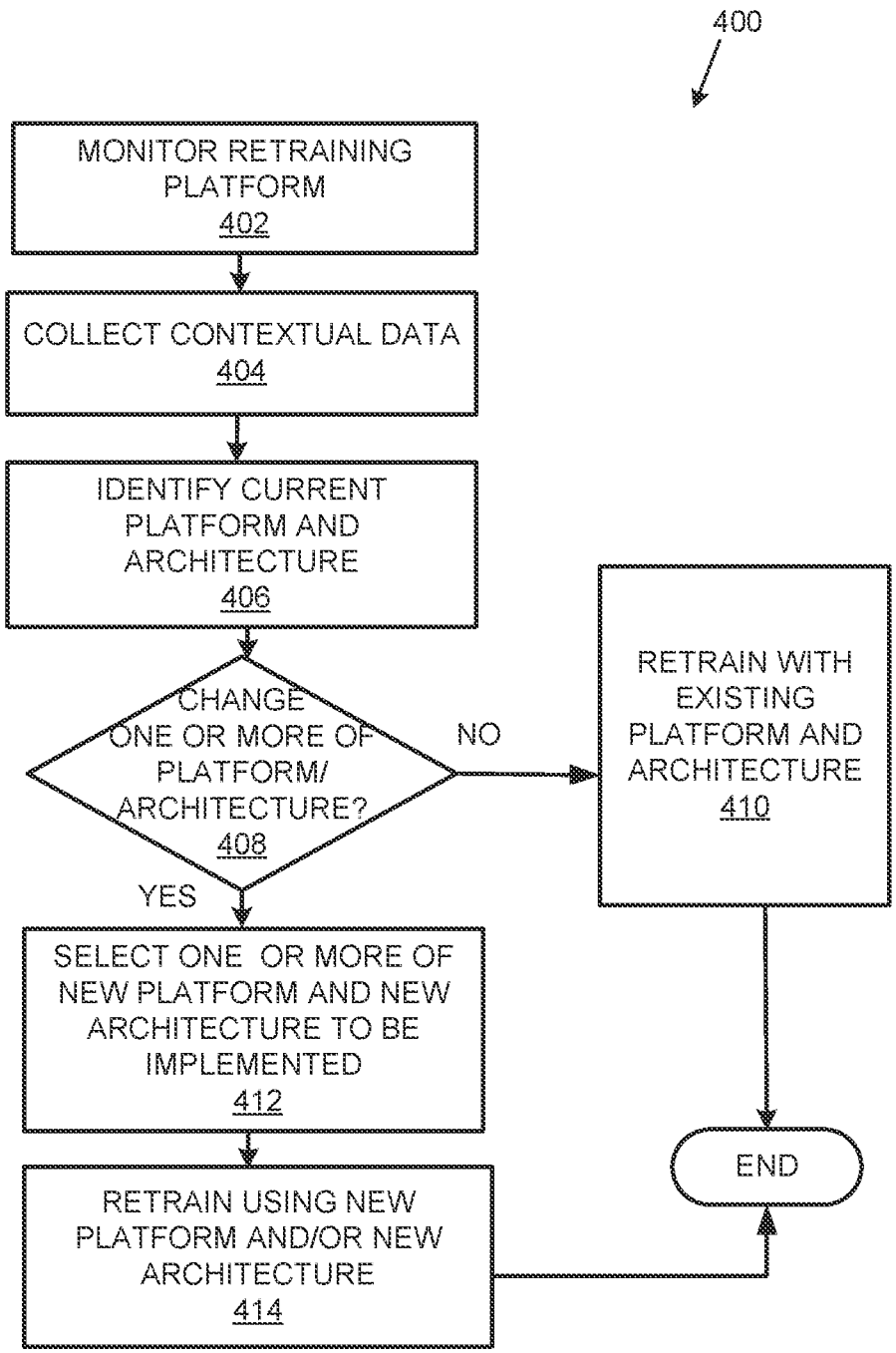
FIG. 4 shows a flowchart of a method of maintaining the sustainability of a production ML model platform in accordance with the examples disclosed herein.

FIG. 4 shows a flowchart 400 of a method of maintaining the sustainability of the production ML model system 160 in accordance with the examples disclosed herein. The method begins at 402 wherein the model retraining platform 150 is monitored by the retraining monitoring system 100. In an example, the retraining monitoring system 100 can be communicatively coupled to the production model training platform 150 included in the production ML model system 160. At 404, the contextual data 172 of the various components of the production ML model system 160 including the ML models 140 is collected. Each of the components may be monitored using different metrics as detailed herein. The contextual data 172 thus collected can include the parameters that enable sustainability estimations of the component such as but not limited to, energy demand, energy efficiency, carbon emission, overall infrastructure demand, and infrastructure efficiency. The model retraining platform 150 (or another component in the production ML model system 160 including the ML models 140) may determine that the accuracies of each of the ML models 140 have fallen and the models require retraining.

If it is determined that at least one of the ML models 140 needs to be retrained, the current metadata of the production model training platform 150 is obtained at 406 by the retraining monitoring system 100. The current metadata may include the current retraining platform being used and the current retraining architecture being implemented. For example, one of the two platforms, the cloud retraining platform 120 and the on-premises retraining platform 130 may be used and one of the periodic or reactive retraining architectures can be implemented. It is further determined at 408 if one or more of the platforms or the retraining architectures are to be changed. In an example, the determination regarding the change in the platform or the retraining architecture can be made based on whether the sustainability of the current platform or the current retraining architecture meets certain predetermined criteria. If it is determined at 408, that neither the current platform nor the current architecture needs to be changed, then the ML models 140 are continued to be retrained on the current platform using the current architecture at 410.

If it is determined at 408 that one or more of the current platform and the current architecture/policy is to be changed, selections are made for one or more of the retraining platform and the architecture at 416. Again, the determination regarding the aspect that needs to be changed i.e., whether the retraining platform or the retraining architecture or both need to be changed for the production ML model system 160 will depend on the corresponding sustainability criteria that are applied to the current platform and the current architecture. In an example, the sustainability criteria can include but are not limited to, under-utilized infrastructure, overloaded components, and inefficient location management. Under-utilized infrastructure consumes energy without any output. Overloaded components may cause delay which leads to excess energy consumption. Inefficient location management can lead to excess carbon emissions. Based on the selection(s) at 416, at least one of the ML models 140 that needs retraining is retrained using the new platform and/or the newly selected architecture.

Figure 5:
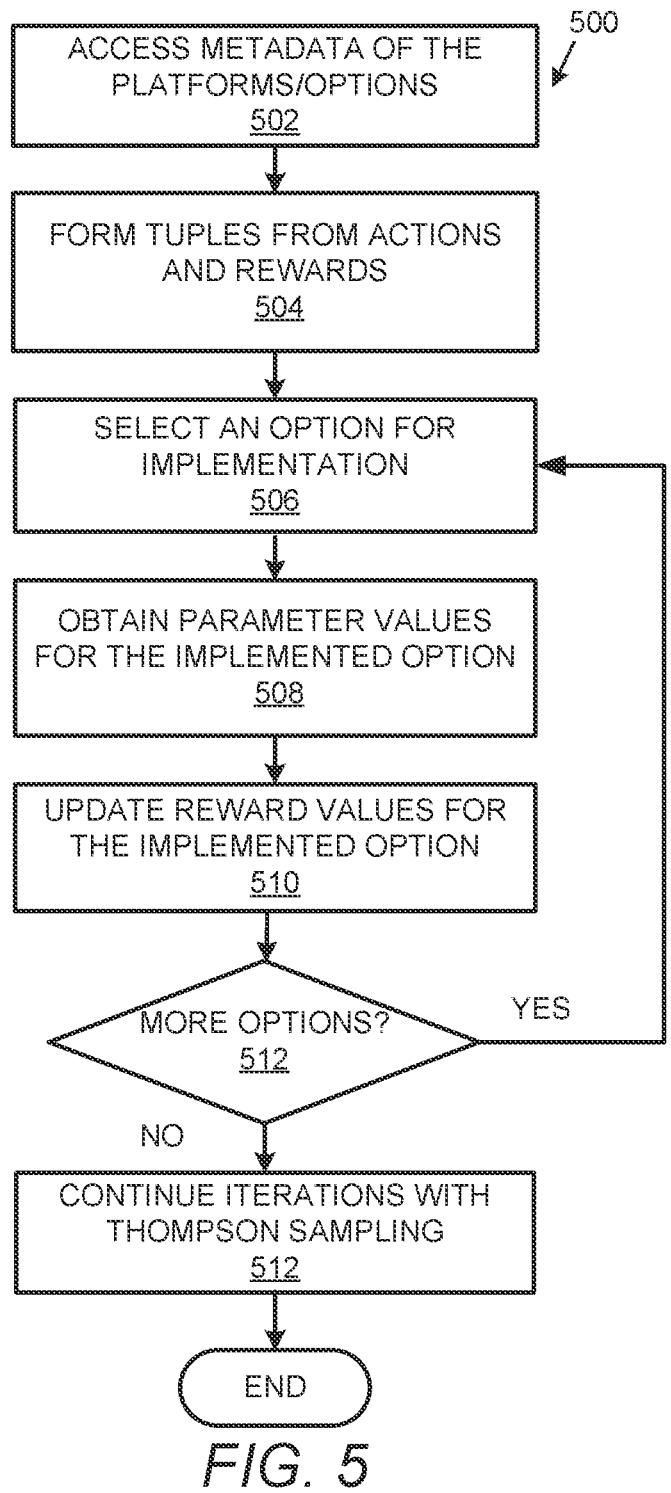
FIG. 5 shows a flowchart of a method of selecting a platform for retraining the ML models in accordance with the examples disclosed herein.

FIG. 5 shows a flowchart 500 that details a method of selecting a platform for retraining the ML models 140 in accordance with the examples disclosed herein. In an example, the process shown in the flowchart 500 can be executed by the trade-off analyzer 106. The method begins at 502, wherein the metadata used for platform selection is accessed from the contextual data 172. As mentioned above, the metadata can include elements that enable estimating the sustainability of the different platforms which include the cloud retraining platform 120 and the on-premises retraining platform 130. At 504, tuples are formed from a set of actions and a collection of reward distributions for which the parameters may be initially unknown. Referring again to the implementation by the retraining monitoring system 100, the various platforms can be characterized as the arms of the multi-armed bandit problem wherein each option provides a reward. In the context of the retraining monitoring system 100, the selection of one of the cloud retraining platform 120 and the on-premises retraining platform 130 provides a corresponding reward. The reward of an option (arm) is a measure of the sustainability of the respective arm.

As some of the parameter values such as the delay in communication processing may be unknown in the first iteration when the options are yet to be implemented, one of the options may be randomly selected at 506. Accordingly, one of the cloud retraining platform 120, or the on-premises retraining platform 130 is randomly selected. At 508, the parameter values including the accuracy of the retrained ML models can be obtained upon the implementation of the option selected at 506. Various parameter values for calculating rewards for different arms can be obtained from the contextual data 172 and the data collected at 508. The parameter values enable obtaining the two factors used in calculating the reward, which includes, for example, the delay in communication processing and energy consumption of processing. The energy consumption of processing can be further based on two factors—the duration of the processing and the energy source of the data center. In an example, the energy source of the data center can have different values based on whether the data source runs on a 100% green source (e.g., value=1), 100% non-renewable carbon-based source (e.g., value=2), or hybrid source (value=1.5). At 510, the rewards corresponding to the implemented option are calculated. In an example, the reward for an option can be obtained as:

$$\text{Reward of an option: } (1-(\text{current delay}/\text{max\_allowed\_delay}))+(1-(\text{processing duration}/\text{max\_allowed\_duration}))/\text{energy\_source} \quad \text{Eq. (7)},$$

wherein, current delay=delay in data transmission of the retraining platform 150, max_allowed_delay=maximum delay allowed on the retraining platform 150, processing duration=duration of a process/action associated with the reward, max_allowed_duration=maximum duration allowed for the process/action associated with the reward, and energy_source=the energy source of the retraining platform 150.

The prior distribution associated with an option can be represented by the gaussian distribution $N(1,1)$. The rewards are thus calculated for each of the options. Accordingly, at 512, it is determined if another option remains for reward calculation. If yes, the method returns to 506 to select the next option. If the rewards are calculated for all the options and no further options exist for reward calculation, the method moves to 514, wherein Thompson sampling is used for the next iteration.

Below is an illustration of the process described above. Let the production ML model retraining platform 150 have parameter values max_allowed_delay=4 milliseconds and max_allowed_processing=5 milliseconds. Let the energy source of the on-premises data center be 100% green which would set the parameter energy_source to 1. Let the energy source of the public cloud data center be a hybrid energy source which would set the parameter energy_source to 1.5. At time instance t1, the retraining monitoring system 100 randomly samples the prior distributions of the options, i.e., N(1,1) and N(1,1), and selects the option (i) on-premises data center at step 506. The parameter values can be obtained by observing the production ML model retraining platform 150. The observed values include:

Current delay=1 millisecond,
Processing duration=2 milliseconds, and

The reward=(1−(1/4))+(1−(2/5))/1=1.35    using Eq. (4).

The updated reward distribution for the on-premises data center is N(1.175, 0.5).

At time instance t2, the retraining monitoring system 100 randomly samples the prior distributions of the options, i.e., N(1.175, 0.5) and N(1,1), and selects the public cloud data center and the observed values are recorded as:

Current delay=2 milliseconds,
Processing duration=1 milliseconds.

The reward is obtained using Eq. (4) as (1−(1/2))+(1−(1/5))/1.5=1.03. The updated reward distribution of the public cloud data center is N(1.01, 0.5). Observation after time instance t2 is that an on-premises data center is more sustainable than the public cloud data center for the described trade-off. The retraining monitoring system 100 continues further processing by following the concept of Thomson sampling.

Figure 6:
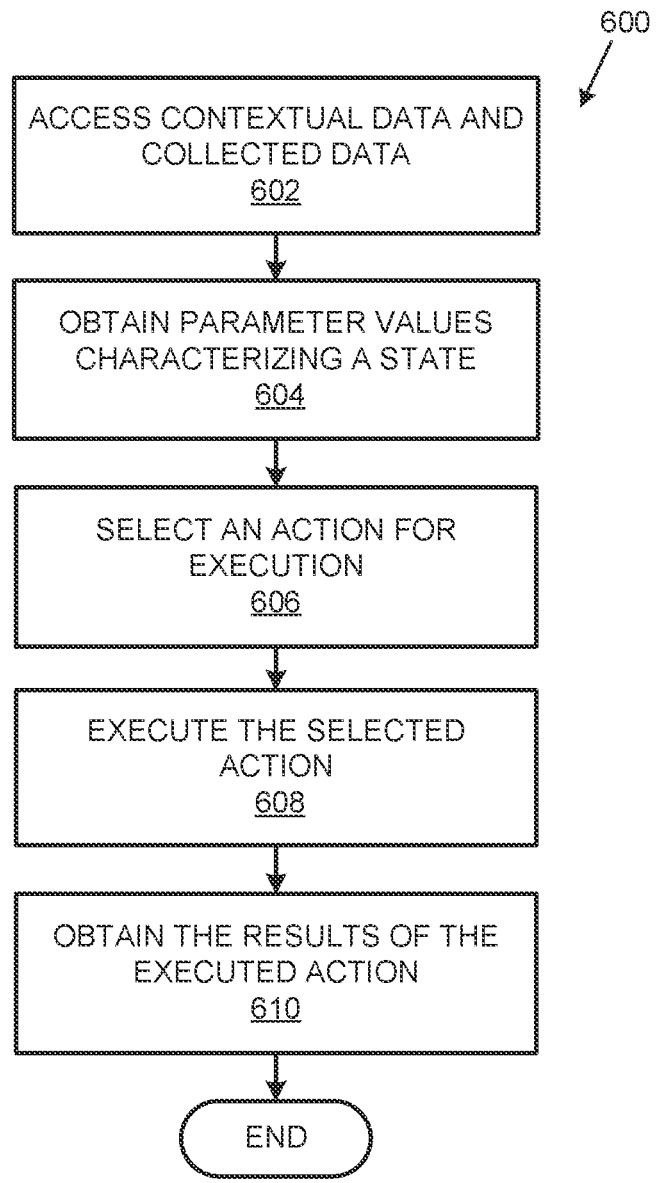
FIG. 6 shows a method of continuous run-time architectural evaluation in accordance with the examples disclosed herein.

FIG. 6 shows a method of continuous run-time architectural evaluation in accordance with the examples disclosed herein. In an example, the method may be implemented by the architecture analyzer 108. The method begins at 602, wherein the contextual data 172 and any currently collected data are accessed. The parameter values that characterize a state are obtained at 604 from the data accessed at 602. For a reinforcement learning model implemented by the architecture analyzer 108, each state can be parameterized by two parameters, $d_n$—the number of new data samples and $d_d$—the number of new and drifted data samples. An action from a set of actions can be selected at 606 using the parameter values. For example, if $d_n$<=Predefined threshold value, any one of the two actions below can be executed with equal likelihood:

Action A1: wait for the next batch of data with a probability of 0.5
Action A2: Test for data shift of the current batch with a probability of 0.5

For example, if $d_n$>=Predefined threshold value, then three actions can be executed with different probabilities:

Action A3: Retrain with a probability of 0.9,
Action A4: wait for the next batch of data with a probability of 0.05, and
Action A5: Test for data shift of the current batch with a probability of 0.05.

The exact action from the three possible actions A3, A4 and A5 to be executed can be determined based on the end of an episode as detailed infra. The selected action is executed at 608 and the results of the executed action are obtained at 610. In an example, the results can include a reward (R) wherein R can have values based on the energy source of the retraining platform as shown in Eqs. (4) and (5) above and the success of the retraining of the ML models 140. R is zero per Eq. (6) if no retraining occurs during the execution of the action e.g., if one of the A1, A2, actions is executed. The success of retraining can be estimated from the collected monitored data. The retraining can be considered successful if the retrained ML model provides better accuracy than the prior model.

Figure 7:
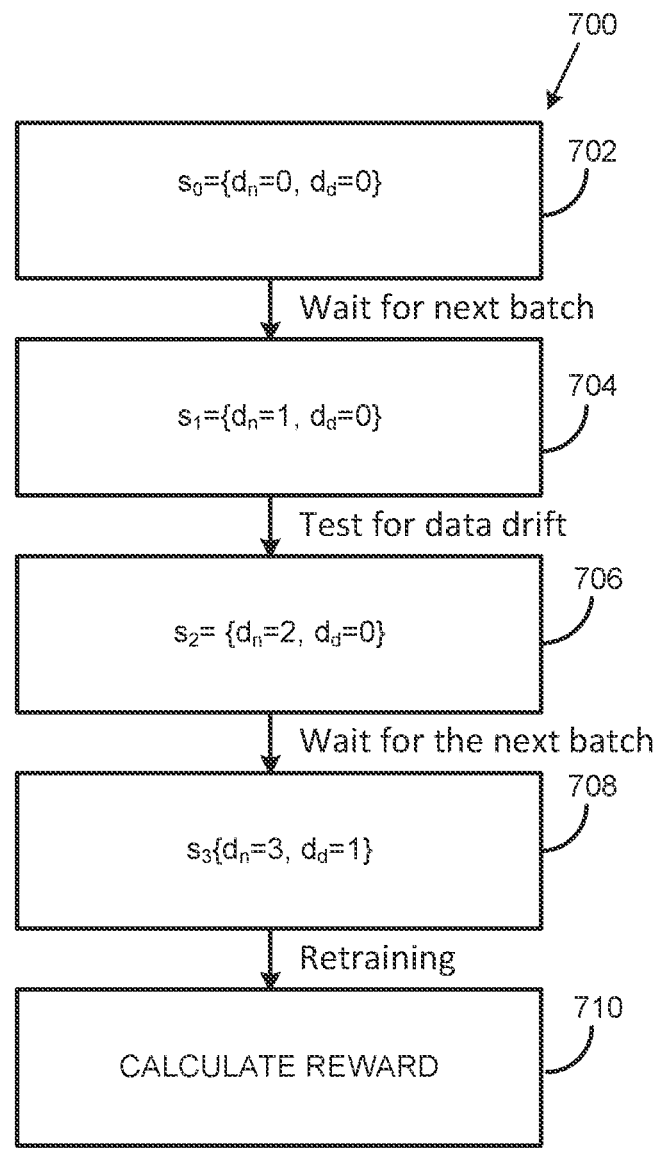
FIG. 7 shows a block diagram that illustrates executing a selected action in accordance with the examples disclosed herein.

FIG. 7 shows a block diagram 700 that illustrates executing the selected action in accordance with the examples disclosed herein. The retraining monitoring system 100 monitors the architecture of the production ML model retraining platform 150 and continuously collects data. The collected data is called history. The collected data is partitioned into multiple episodes and each episode can be populated by a sequence of state, action, and reward, <S1, A1, R1; S2, A2, R2, . . . , St, At, Rt>. The deployment of a new model or the retraining of a model with newly sampled data can be considered an end of an episode. Each episode may include multiple time steps. An episode is started at 702 wherein the parameter values can be initialized, so that at time step so, parameter $d_n$=0 and $d_d$=0. Therefore, the action taken at 702 is to wait for the next batch of data points. At 704 the first time step s, values of $d_n$=1 and $d_d$=0 indicate that new data points were received. Hence, the action taken is to test for data drift, and $d_d$=0 shows that no data drift was detected. At 706 the second time step $s_2$ is shown and it is detected that $d_n$=2 and $d_d$=0. Again, no data drift is detected. Hence, the action executed at the second time step 706 is to wait for the next batch of data. At 708 the third time step $s_3$ is shown where the parameters $d_n$=3 and $d_d$=1. The data drift is non-zero at 708, accordingly, retraining of the ML models 140 is the action implemented. At 710, the reward is obtained to determine if a selected architecture is sustainable.

The value of the policy/architecture is obtained using Eq. (1) wherein the parameters take values:

$$w = [1, 1, 1, 1]$$
$$\bullet \alpha = 0.01$$
$$\bullet \gamma = 1.0$$

Below are shown the steps of updating the weight vector w during an episode to determine the sustainability of a selected architecture:

Based on the value of time step 3:

$\bullet w = [1, 1, 1, 1] + 0.01(1*(-20) + 0)[1, 3, 1, 3] =$ $[1, 1, 1, 1] + [-0.2, -0.6, -0.2, -0.6] = [0.8, 0.4, 0.8, 0.4]$ Based on the value of time step 2

$\bullet w = [0.8, 0.4, 0.8, 0.4] +$ $0.01(1*(-20) + [0.8, 0.4, 0.8, 0.4][1, 2, 0, 0]T)[1, 2, 0, 0] =$ $[0.616, 0.032, 0.8, 0.4]$ Based on the value of time step 1

$\bullet w = [0.616, 0.032, 0.8, 0.4] +$ $0.01(1*(-20) + [0.616, 0.032, 0.8, 0.4][1, 1, 0, 0]T)[1, 1, 0, 0] =$ $[0.423, -0.161, 0.8, 0.4]$ After episode 1, the updated w=[0.423, −0.161, 0.8, 0.4].

From the data collected in episode 1 and updated w, it can be observed that the periodic retraining architecture is not sustainable when the value of $d_n$=3. The decision of periodic retraining is based on the value of $d_n$. The weight of $d_n$<0 when $d_n$=3. The negative weight signifies the inefficiency of the architectural decision.

Figure 8:
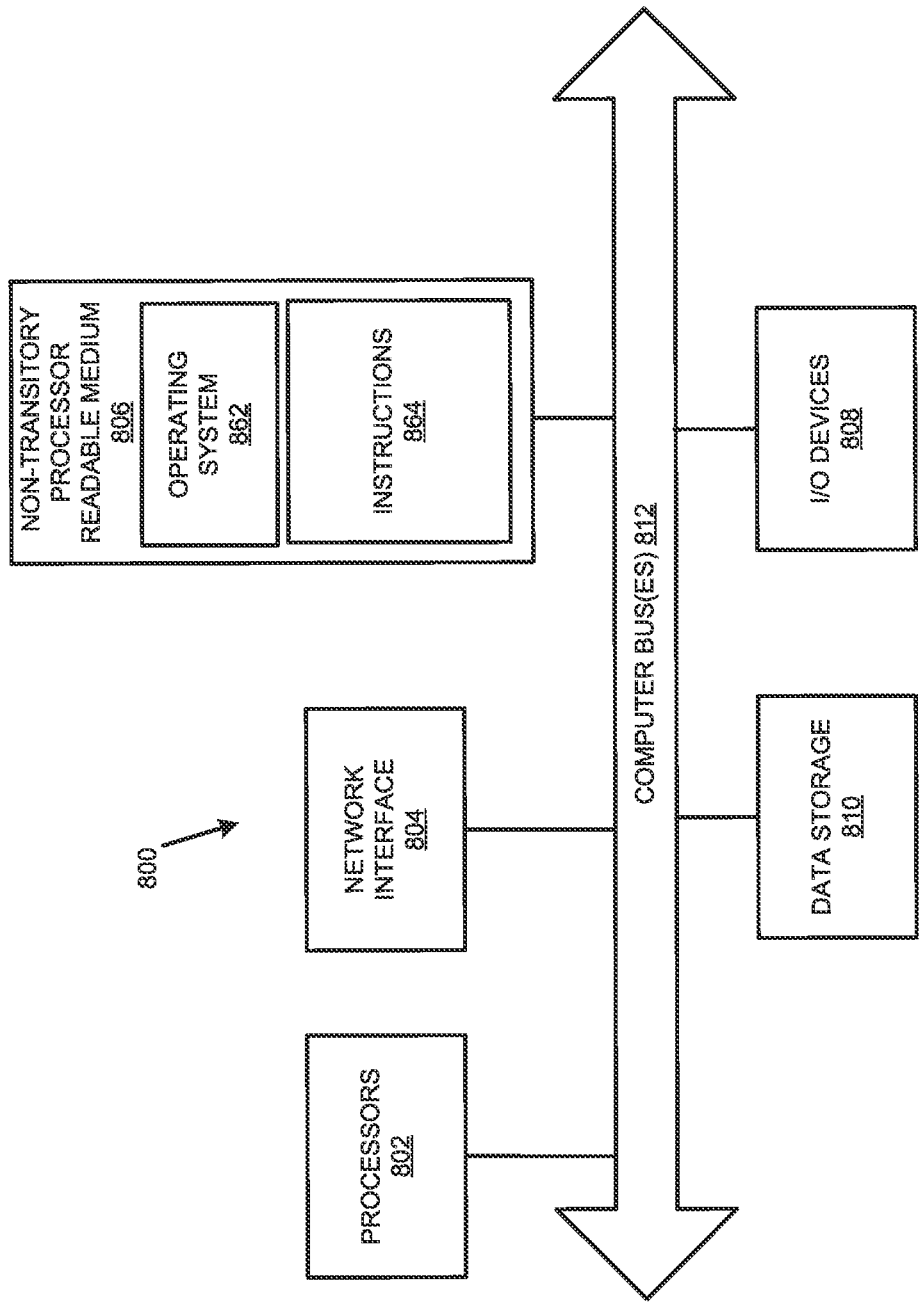
FIG. 8 illustrates a computer system that may be used to implement the retraining monitoring system in accordance with the examples disclosed herein.

FIG. 8 illustrates a computer system 800 that may be used to implement the retraining monitoring system 100 in accordance with the examples disclosed herein. More particularly, computing machines such as desktops, laptops, smartphones, tablets, and wearables which may be used to generate or access the data from the retraining monitoring system 100 may have the structure of the computer system 800. The computer system 800 may include additional components not shown and some of the process components described may be removed and/or modified. In another example, a computer system 800 can sit on external-cloud platforms such as Amazon Web Services, AZURE® cloud or internal corporate cloud computing clusters, or organizational computing resources, etc.

The computer system 800 includes processor(s) 802, such as a central processing unit, ASIC or another type of processing circuit, input/output (I/O) devices 808, such as a display, mouse keyboard, etc., a network interface 804, such as a Local Area Network (LAN), a wireless 802.11x LAN, a 3G, 4G or 5G mobile WAN or a WiMax WAN, and a computer-readable or processor-readable medium 806. Each of these components may be operatively coupled to a bus 808. The processor-readable medium 806 may be any suitable medium that participates in providing instructions to the processor(s) 802 for execution. For example, the processor-readable medium 806 may be a non-transitory or non-volatile storage medium, such as a magnetic disk or solid-state non-volatile memory, or a volatile medium such as RAM. The instructions or modules stored on the processor-readable medium 806 may include machine-readable instructions 864 executed by the processor(s) 802 that cause the processor(s) 802 to perform the methods and functions of the retraining monitoring system 100.

The retraining monitoring system 100 may be implemented as software or machine-readable instructions stored on a non-transitory processor-readable storage medium and executed by one or more processors 802. For example, the computer-readable storage medium or non-transitory processor-readable medium 806 may store an operating system 862, such as MAC OS, MS WINDOWS, UNIX, or LINUX, and code/instructions 864 for the retraining monitoring system 100. The operating system 862 may be multi-user, multiprocessing, multitasking, multithreading, real-time, and the like. For example, during runtime, the operating system 862 is running and the code for the retraining monitoring system 100 is executed by the processor(s) 802.

The computer system 800 may include a data storage 810, which may include non-volatile data storage. The data storage 810 stores any data used by the retraining monitoring system 100. The data storage 810 may be used as a local data storage e.g., the data storage 170 that stores the contextual data 172 obtained or generated by the retraining monitoring system 100.

The network interface 804 connects the computer system 800 to internal systems for example, via a LAN. Also, the network interface 804 may connect the computer system 800 to the Internet. For example, the computer system 800 may connect to web browsers and other external applications and systems via the network interface 804.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A machine learning (ML) model retraining monitoring system, comprising: at least one processor;
    a non-transitory, processor-readable medium storing machine-readable instructions that cause the at least one processor to:
    collect contextual variable values associated with a production Machine Learning (ML) model system including a production ML model retraining platform that retrains one or more production ML models outputting results employed by a computing system;
    model as a respective arm of a multi-armed bandit problem, each of multiple options available for retraining the one or more production ML models by the production ML model retraining platform, wherein each of the respective arms provides a corresponding reward representative of a corresponding sustainability;
    model as multiple policies, a plurality of production retraining architectures with one or more actions executable on the production ML model retraining platform,
        wherein the multiple policies include a current policy of the production ML model retraining platform;
    determine that one or more of the options is to be selected and the current policy is to be changed,
        wherein the determination is based on a corresponding sustainability of a currently selected option and the current policy;
    change one or more of the currently selected option and the current policy of the production ML model retraining platform respectively to a selected option and a selected policy based at least on the determination; and
    enable retraining of the production ML models on the production ML model retraining platform using one or more of the selected option and the selected policy based on the change,
    wherein the plurality of production retraining architectures include periodic retraining architecture and reactive retraining architecture, and
    wherein for modelling the plurality of production retraining architectures, the at least one processor executes instructions to:
        representing the plurality of production retraining architectures as a tuple including a set of states, a feature set, and an action set,
        wherein each state of the set of states is parameterized by number of new data samples and number of new and drifted data samples and the action set includes the actions executable on the production ML model retraining platform.

2. The ML model retraining monitoring system of claim 1, wherein for collecting the contextual variable values the at least one processor executes instructions to:
    collect metadata regarding inputs, outputs, processing locations, infrastructure, and processes of the production ML model system.

3. The ML model retraining monitoring system of claim 1, wherein the multiple options represent a plurality of retraining platforms that include a cloud retraining platform and an on-premises retraining platform and the currently selected option is one of the plurality of retraining platforms.

4. The ML model retraining monitoring system of claim 3, wherein to determine the option to be selected the at least one processor executes instructions to:
model each of the plurality of retraining platforms as one of the respective arms of a multi-armed bandit problem.

5. The ML model retraining monitoring system of claim 4, wherein to change the current retraining platform the at least one processor executes instructions to:
calculate the corresponding rewards using at least the contextual variable values; and
select via Thompson sampling, one of the plurality of retraining platforms associated with one of the respective arms that maximizes the sustainability.

6. The ML model retraining monitoring system of claim 5, wherein to calculate the corresponding rewards the at least one processor executes instructions to:
obtain values for delay of communication and energy consumption of the plurality of retraining platforms.

7. The ML model retraining monitoring system of claim 6, wherein for calculating each of the corresponding rewards, the at least one processor executes instructions to:
obtain the corresponding rewards as:

reward=(1−(current delay/max_allowed_delay))+(1−(processing duration/max_allowed_duration))/energy_source, wherein, current delay=delay in data transmission of the production ML model system,
max_allowed_delay=maximum delay allowed for data transmission on the production ML model retraining platform,
processing duration=duration of an action associated with the reward,
max_allowed_duration=maximum duration allowed for the action, and
energy_source=the energy source of the production ML model system.

8. The ML model retraining monitoring system of claim 1, wherein for selecting one of the multiple policies that maximizes the sustainability, the at least one processor executes instructions to:
select an action from the action set based at least on a comparison of parameter values with predetermined thresholds.

9. The ML model retraining monitoring system of claim 8, wherein the set of actions includes waiting for a next batch of data from the production ML model retraining platform, testing the data from the production ML model retraining platform for a data shift, and retraining the one or more production ML models.

10. The ML model retraining monitoring system of claim 8, wherein the non-transitory, processor-readable medium stores further machine-readable instructions that cause the at least one processor to:
obtain rewards corresponding to the plurality of production retraining architectures as:
reward of a policy of the plurality of production retraining architectures=10/(energy_source) if retraining is successful, and reward of the policy=−10*(energy_source) if retraining is unsuccessful and wherein energy source is a variable indicative of a type of energy used by the current model retraining platform.

11. The ML model retraining monitoring system of claim 1, wherein the non-transitory, processor-readable medium stores further machine-readable instructions that cause the at least one processor to:
repeat during runtime of the production ML model retraining platform the steps of:
collecting the contextual variable values associated with the production ML model system,
determining that one or more of the current retraining platform and the current policy is to be changed, and
changing one or more of the current retraining platform and the current policy to the selected model retraining platform and the selected policy based at least on the determination.

12. A method of retraining a production Machine Learning (ML) model comprising:
collecting contextual variable values associated with a production Machine Learning (ML) model system including a production ML model retraining platform that retrains one or more production ML models outputting results employed by a computing system;
modeling as a respective arm of a multi-armed bandit problem, each of multiple options available for retraining the one or more production ML models by the production ML model retraining platform, wherein each of the arms provides a corresponding reward representative of a corresponding sustainability;
modeling as multiple policies, a plurality of production retraining architectures with actions executable on the production ML model retraining platform,
wherein the multiple policies include a current policy being implemented;
determining that one or more of the options is to be selected and the current policy is to be changed,
wherein the determination regarding the change is based on sustainability criteria;
changing one or more of a currently selected option and the current policy of the production ML model retraining platform respectively to a selected option and a selected policy based on the determination; and
retraining the production ML models based on one or more of the selected option and the selected policy based on the change,
wherein the plurality of production retraining architectures includes periodic retraining architecture and reactive retraining architecture, and
wherein for modelling the plurality of production retraining architectures, the at least one processor executes instructions to:
representing the plurality of production retraining architectures as a tuple including a set of states, a feature set, and an action set,
wherein each state of the set of states is parameterized by number of new data samples and number of new and drifted data samples and the action set includes the actions executable on the production ML model retraining platform.

13. The method of claim 12, wherein the multiple options represent a plurality of retraining platforms that include a cloud retraining platform and an on-premises retraining platform and the current retraining platform is selected from the plurality of retraining platforms.

14. The method of claim 13, further comprising:
obtaining accuracy of the production ML models after the retraining; and determining a success of the retraining of the production ML models based on a comparison of accuracies of the production ML models before and after the retraining.

15. The method of claim 14, further comprising:
updating weight vectors associated with the multiple policies based on the success of the retraining of the ML models.

16. A non-transitory processor-readable storage medium comprising machine-readable instructions that cause a processor to:
collect contextual variable values associated with a production Machine Learning (ML) model system including a production ML model retraining platform that retrains one or more production ML models outputting results employed by a computing system;
model as a respective arm of a multi-armed bandit problem, each of multiple options available for retraining the one or more production ML models by the production ML model retraining platform, wherein each of the arms provides a corresponding reward representative of a corresponding sustainability;
model as multiple policies, a plurality of production retraining architectures with one or more actions executable on the production ML model retraining platform,
wherein the multiple policies include a current policy of the production ML model retraining platform;
determine that one or more of the options is to be selected and the current policy is to be changed,
wherein the determination regarding the change is based on corresponding sustainability of a currently selected option and the current policy;
change one or more of the currently selected option and the current policy of the production ML model retraining platform respectively to a selected model option and a selected policy based at least on the determination; and
enable retraining of the production ML models on the production ML model retraining platform using one or more of the selected option and the selected policy based on the change,
wherein the plurality of production retraining architectures include periodic retraining architecture and reactive retraining architecture, and
wherein for modelling the plurality of production retraining architectures, the at least one processor executes instructions to:
represent the plurality of production retraining architectures as a tuple including a set of states, a feature set, and an action set,
wherein each state of the set of states is parameterized by number of new data samples and number of new and drifted data samples and the action set includes the actions executable on the production ML model retraining platform.

17. The non-transitory processor-readable storage medium of claim 16, wherein the multiple options represent a plurality of retraining platforms that include a cloud retraining platform and an on-premises retraining platform.

* * * * *